United States Patent
Said

(10) Patent No.: US 8,896,631 B2
(45) Date of Patent: Nov. 25, 2014

(54) HYPER PARALLAX TRANSFORMATION MATRIX BASED ON USER EYE POSITIONS

(75) Inventor: Amir Said, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1067 days.

(21) Appl. No.: 12/911,615

(22) Filed: Oct. 25, 2010

(65) Prior Publication Data

US 2012/0098820 A1    Apr. 26, 2012

(51) Int. Cl.
- *G06T 3/00* (2006.01)
- *H04N 13/02* (2006.01)
- *G06T 15/20* (2011.01)
- *G06F 3/01* (2006.01)
- *H04N 13/04* (2006.01)

(52) U.S. Cl.
CPC ............ *G06T 15/20* (2013.01); *H04N 13/0472* (2013.01); *H04N 13/0481* (2013.01); *H04N 13/0479* (2013.01); *H04N 13/0278* (2013.01); *H04N 13/0475* (2013.01); *G06F 3/012* (2013.01); *H04N 13/0477* (2013.01)
USPC ............ 345/653; 345/419; 345/427; 345/644

(58) Field of Classification Search
CPC .................................. G06T 3/00; G06F 3/012
See application file for complete search history.

(56) References Cited

U.S. PATENT DOCUMENTS

| | | | |
|---|---|---|---|
| 5,268,677 A | 12/1993 | Frasier | |
| 5,742,331 A | 4/1998 | Uomori et al. | |
| 6,636,211 B2 * | 10/2003 | Chartier et al. | 345/420 |
| 7,308,111 B2 | 12/2007 | Doudnikov et al. | |
| 7,656,401 B2 * | 2/2010 | D'Amora | 345/419 |
| 2008/0055730 A1 * | 3/2008 | Lin et al. | 359/602 |
| 2009/0051699 A1 * | 2/2009 | Posa et al. | 345/619 |
| 2009/0083673 A1 | 3/2009 | Fitzmaurice et al. | |
| 2009/0244081 A1 * | 10/2009 | Abbas | 345/581 |
| 2009/0313584 A1 * | 12/2009 | Kerr et al. | 715/849 |
| 2010/0151943 A1 * | 6/2010 | Johnson et al. | 463/32 |
| 2010/0328428 A1 * | 12/2010 | Booth et al. | 348/46 |
| 2011/0243388 A1 * | 10/2011 | Sakaguchi et al. | 382/103 |

FOREIGN PATENT DOCUMENTS

| | | |
|---|---|---|
| CN | 101539405 A | 9/2009 |
| WO | WO-2008127202 | 10/2008 |

OTHER PUBLICATIONS

A Vision-Based Head Tracker for Fish Tank Virtual Reality—VR without Head Gear, Rekimoto, 1995, pp. 94-100.*
Enhancing Fish Tank VR, Mulder et al., 2000, pp. 1-8.*
Basic Information about Balancing Machines, Shonan Shimadzu, 2007, pp. 1-6.*
Real-Time Digital Image Stabilization Using Kalman Filters, Erturk, 2002, pp. 317-328.*
Cachya Software, "Cachya Head Tracking Software", <http://www.cachya.com/esight/overview.php>, pp. 1-2, Nov. 5, 2006.
Johnny Lee, "Head Tracking for Desktop VR Displays using the WiiRemote", <http://www.youtube.com/watch?v=Jd3-eiid-Uw>, pp. 1-2, 2007.

* cited by examiner

*Primary Examiner* — David Zarka
*Assistant Examiner* — Phong Nguyen

(57) ABSTRACT

A method for displaying a 3D image in virtual reality. The method includes defining a hyper parallax transformation matrix based on user eye position, applying the hyper parallax transformation matrix to a scene graph, and displaying hyper parallax of the 3D image. A realistic simulation of parallax of said 3D image is exaggerated.

18 Claims, 3 Drawing Sheets

300

```
┌─────────────────────────────────────────────────────────────────┐
│ DEFINE A HYPER PARALLAX TRANSFORMATION MATRIX BASED ON USER EYE │
│                         POSITION                                │
│                           310                                   │
│  ┌───────────────────────────────────────────────────────────┐  │
│  │ DEFINING A HYPER PARALLAX TRANSFORMATION BASED ON A       │  │
│  │ PRODUCT OF: A Z-AXIS TRANSLATION; AN X-AXIS ROTATION;     │  │
│  │ A Y-AXIS ROTATION; A Z-AXIS ROTATION; AND AN INVERSE      │  │
│  │ Z-AXIS TRANSLATION                                        │  │
│  │                         312                               │  │
│  └───────────────────────────────────────────────────────────┘  │
│                                                                 │
│  ┌───────────────────────────────────────────────────────────┐  │
│  │ DEFINING A HYPER PARALLAX TRANSFORMATION BASED ON A       │  │
│  │ PRODUCT OF: A Z-AXIS TRANSLATION; AN X-AXIS ROTATION;     │  │
│  │ A Y-AXIS ROTATION; AND AN INVERSE Z-AXIS TRANSLATION      │  │
│  │                         314                               │  │
│  └───────────────────────────────────────────────────────────┘  │
│                                                                 │
│  ┌───────────────────────────────────────────────────────────┐  │
│  │ DEFINING A HYPER PARALLAX TRANSFORMATION MATRIX BASED ON  │  │
│  │ USER EYE POSITION, WHEREIN HAND-ACTIVATED INTERFACES ARE  │  │
│  │ NOT REQUIRED                                              │  │
│  │                         316                               │  │
│  └───────────────────────────────────────────────────────────┘  │
│                                                                 │
│  ┌───────────────────────────────────────────────────────────┐  │
│  │ CHANGE A POINT WHICH IS A CENTER OF ROTATION OF SAID 3-D  │  │
│  │ IMAGE TO A CENTER OF GRAVITY OF THE 3-D IMAGE             │  │
│  │                         318                               │  │
│  └───────────────────────────────────────────────────────────┘  │
│                                                                 │
│  ┌───────────────────────────────────────────────────────────┐  │
│  │ DEFINE A ROTATION MATRIX BASED ON A DIRECT TRANSLATION    │  │
│  │ FROM THE USER EYE POSITION                                │  │
│  │                         319                               │  │
│  └───────────────────────────────────────────────────────────┘  │
└─────────────────────────────────────────────────────────────────┘
                                │
                                ▼
┌─────────────────────────────────────────────────────────────────┐
│     APPLY THE HYPER PARALLAX TRANSFORMATION MATRIX TO A         │
│                       SCENE GRAPH                               │
│                           320                                   │
└─────────────────────────────────────────────────────────────────┘
                                │
                                ▼
┌─────────────────────────────────────────────────────────────────┐
│ DISPLAY HYPER PARALLAX OF THE 3-D IMAGE, WHEREIN A REALISTIC    │
│   SIMULATION OF PARALLAX OF THE 3-D IMAGE IS EXAGGERATED        │
│                           330                                   │
└─────────────────────────────────────────────────────────────────┘
                                │
                                ▼
┌─────────────────────────────────────────────────────────────────┐
│       FILTER IMAGE INSTABILITY, WHEREIN THE FILTERING IS        │
│                        TIME-VARYING                             │
│                           340                                   │
│  ┌───────────────────────────────────────────────────────────┐  │
│  │ FILTER IMAGE INSTABILITY IN RESPONSE TO SPEED MAGNITUDE   │  │
│  │ OF THE USER EYE POSITION                                  │  │
│  │                         345                               │  │
│  └───────────────────────────────────────────────────────────┘  │
└─────────────────────────────────────────────────────────────────┘
```

FIG. 3

HYPER PARALLAX TRANSFORMATION MATRIX BASED ON USER EYE POSITIONS

BACKGROUND

Tracking a user's head position relative to a display enables a realistic presentation of 3D scenes through the use of motion parallax. Knowing the relative position of the user's head relative to the display a computer program can change the displayed views of 3D virtual objects and scenes. Accordingly, a user can inspect virtual 3D objects and scenes in a natural way by reproducing the way the user sees physical objects. However, head tracking relative to a display to view 3D image has limitations.

For example, a user of a flight simulation, would only be able to see views that the user would naturally see while flying the airplane. As such, during simulated flight, the user would not be able to leave the cockpit and inspect the plane.

BRIEF DESCRIPTION OF THE DRAWINGS

FIG. 3 illustrates an example of a flow chart of a method for displaying a 3D image in virtual reality, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
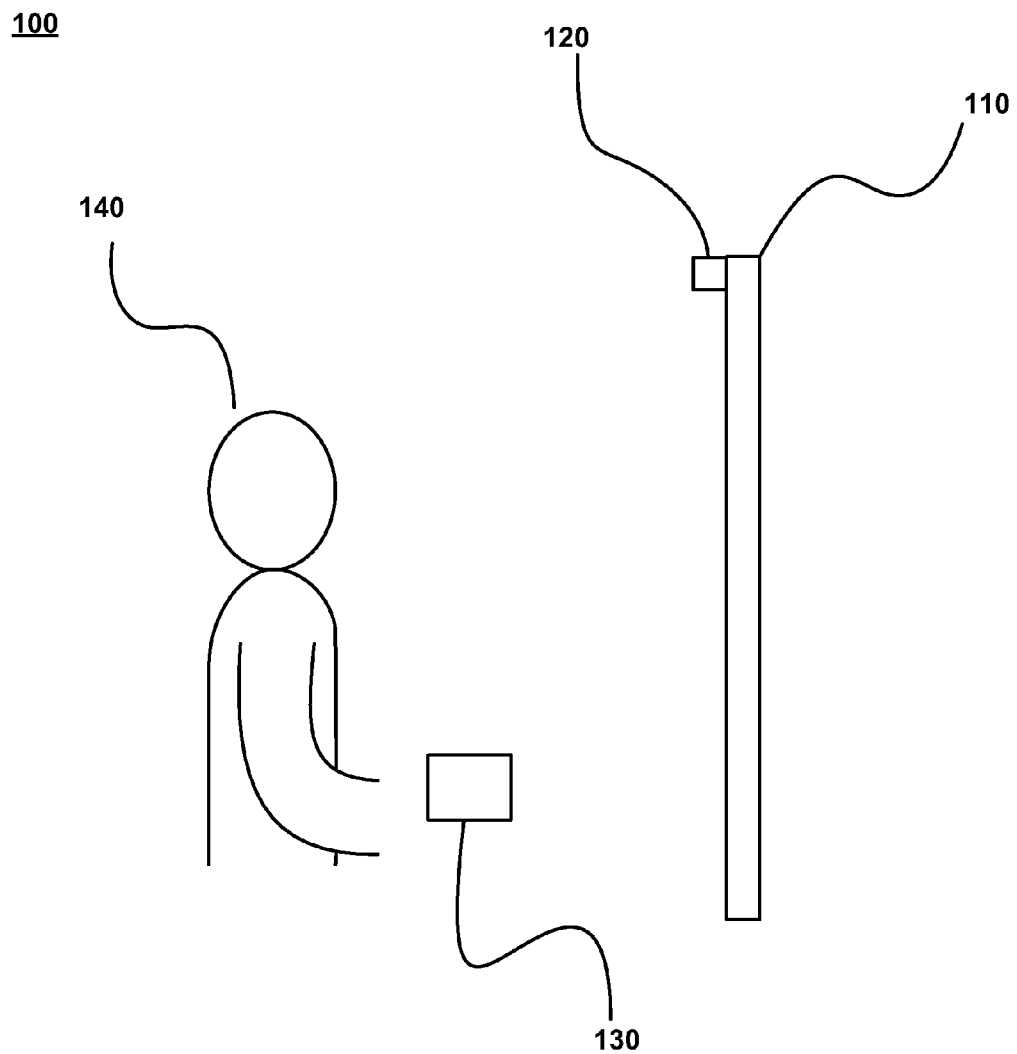
FIG. 1 illustrates an example of a virtual reality display system, in accordance with an embodiment of the present invention.

FIG. 1 depicts a virtual reality display system (VRDS) 100, in accordance to an embodiment of the present invention. VRDS 100 includes display screen 110 and eye position detector 120. Virtual reality is to be understood as a realistic simulation of an environment, including 3D graphics.

Display screen 110 is configured to display images that are viewed as 3D objects in virtual reality. Display screen 110 can be any type of display that is able to display images that are viewed as 3D objects in virtual reality. In one embodiment, user 140 wears glasses (not shown) that enhance the images displayed and viewed as 3D objects in virtual reality.

Eye position detector 120 is configured to track the head motion of user 140. In one embodiment, eye position detector 120 tracks the motion of the eyes of user 140. For example, eye position detector 120 detects the motion of an LED or retroreflectors proximate each eye on eyeglasses (not shown) worn by user 140. In another embodiment, eye position detector 120 tracks head position through its profile. The tracked head position is then used to estimate user's eye position. Eye position detector 120 can be any motion detector (e.g., a camera) able to track the head motion of user 140.

VRDS 100 may also include a hand actuated interface 130. Hand actuated interface 130 includes, but is not limited to, a mouse, a tracking ball, etc. In various embodiments, hand actuated interface is utilized for actions such as, but not limited to, pointing, changing object characteristics, lighting, etc.

In general, during use of VRDS 100, the head position of user 140 is utilized in (1) changing the perspective of the viewed objects via motion parallax and (2) rendering of the viewed objects via hyper parallax.

Parallax or motion parallax is the apparent displacement of an observed object due to a change in the position of the observer. For example, if user 140 looks straight at a 3D car on display 110, user 140 may only see the front of the car (e.g., front tires, grill, windshield, etc.) However, if eye position detector 120 detects user 140 moving slightly to his right, then user 140 is able to see a perspective view that includes the left side of the car (e.g., driver side door, driver side front and rear tires, etc) because of motion parallax. In other words, the actual physical movement of moving slightly to the right of user 140 realistically translates to the user moving slightly to the right in the user's virtual reality.

Hyper parallax or hyper motion parallax is the exaggeration of apparent displacement of an observed object due to a change in the position of the observer. For example, if eye position detector 120 detects user 140 slightly to his right, then user 140 is able to zoom in on the left or passenger side of the 3D car and also the rear of the 3D car. Moreover, user 140 may also zoom into the interior of the 3D car or onto another object (e.g., another vehicle) behind the 3D car. In other words, the actual physical movement of user 140 of moving slightly to the right is exaggerated when translated in the user's virtual reality.

Figure 2:
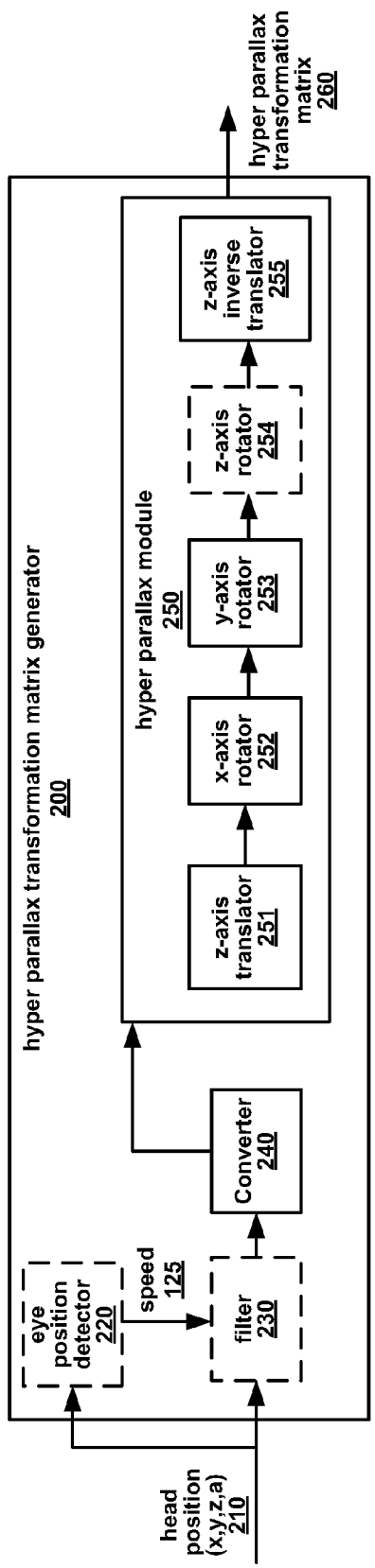
FIG. 2 illustrates an example of a hyper parallax transformation matrix generator, in accordance with an embodiment of the present invention.

FIG. 2 depicts hyper parallax transformation matrix generator (HPTMG) 200, in accordance to an embodiment. In general, HPTMG 200 extends motion parallax from user position, to enable a user to inspect a 3D object or scene from a much greater range of views (as compared to a strict virtual reality environment), with limited user motion.

HPTMG 200 includes eye position detector 220, filter 230, converter 240 and hyper parallax module 250. In one embodiment, eye position detector 220 and filter 230 are optional.

Converter 240 is configured to implement the conversion of head position to hyper parallax transformation matrix 260. In one embodiment, an intuitive transformation is obtained when y-axis rotation is proportional to x, and x-axis rotation is proportional to y (assuming origin of x and y coordinates defined from center of display).

Hyper parallax module 250 is configured to generate a hyper parallax transformation matrix 260 based on user head position 210. In particular, the tracked head position 210 is used to estimate user's eye position. Accordingly, a realistic simulation of parallax of a 3D image is exaggerated when hyper parallax transformation matrix 260 is applied to a scene graph.

In computer graphics complex objects and scenes are commonly represented with a scene graph. The scene graph contains the information about geometry, and also the geometric transformation that define how each component is displayed, and how the overall scene is to be displayed. The geometric transformations are represented by 4×4 matrices. Also, the geometric transformations are applied to homogeneous coordinates of a 3D projective space.

The user interface (e.g., head motion interface) is related to the computer graphics system. In the display coordinate system, user head position (e.g., face center) is defined by vector (x, y, z) and head roll angle a, which in turn defines hyper parallax transformation matrix 260. Hyper parallax transformation matrix 260 is applied at the root of the scene graph (therefore changing how the scene is viewed).

Hyper parallax module 250 includes z-axis translator 251, x-axis rotator 252, y-axis rotator 253, z-axis rotator 254 and z-axis inverse translator 255. It is to be understood that x, y and z represent the axes in the graphics scene coordinate system.

Z-axis translator 251 is configured to provide a translation about the z-axis. For example, the z-axis translator 251 allows for changing the point which will be the center of rotation.

X-axis rotator 252, y-axis rotator 253 and z-axis rotator 254 allow for rotations around the x-axis, y-axis and z-axis, respectively.

Z-axis inverse translator 255 allows for inverse of the translation by z-axis translator 251.

In one embodiment, z-axis rotator 254 is optional. Accordingly, when z-axis rotation is not utilized, vertical lines of the object or scene remain substantially vertical. Similarly, horizontal lines of the object or scene remain substantially horizontal. Therefore, rotation of the object or scene remains natural and does not incur any awkward translation about the z-axis.

Filter 230 is configured to filter image instability. In one embodiment, filter 230 is a time varying filter used to change the amount of filtering, by changing the filter parameters according to magnitude of speed 125 detected by eye position detector 220. In other words, filter 230 is configured to filter image instability in response to a speed magnitude measured by eye position detector 220.

In various embodiments, image instability occurs if converter 240 depends on the latest estimates of (x, y, z, a) because of position measurement errors. Image instability can produce blurred vision, visual stress, and nausea.

Image instability can be reduced by using linear time invariant filters that smoothes the output by taking into account several measurements. However, this solution can be greatly improved if characteristics of human visual system are considered. When there is enough user motion, the view is changing rapidly, and its quality and stability is not important. When the user stops, on the other hand, view quality and stability should be improved or be at its best, so that the object or scene can be properly viewed. Thus, a time varying filter is utilized.

In one embodiment, hand activated user interfaces 130 is utilized.

In another embodiment, it is inconvenient or impossible to use hand activated interfaces. Therefore, a hand activated user interface is not required. For example, in a tablet interface the user may not want to obstruct the view of the object while inspecting it. In another example, a hand activated user interface may not be available as in the case of signage and advertisement, where customers can use the interface by simply standing in front of a display (and camera).

In various embodiments, the head-position and hand activated interfaces are not mutually exclusive. Their combined use can be better than using multiple menu-trees for changing interaction modes. The head-position controls can be used for vision-related interaction (since they are natural extension of what happens in real-world), while the other controls can be used for other actions, like pointing, changing object characteristics, lighting, etc. The overall system if fine-tuned to the proposed interface, since it exploits the fact that the transformation is for a type of user interface instead of virtual reality. Thus, it can do a better job of stabilizing the viewed images when the user wants to observe them more carefully.

In one embodiment, stereoscopic displays (with or without glasses) are included. Accordingly, there are the same set of transformations, but done twice. One instance of the transformations for creating the view to seen by the left eye, and using the position of the left eye for reference. Another instance of the transformations for right eye view from right-eye position.

In another embodiment, there is a direct translation (mapping) from eye position to a rotation matrix. In general, eye position coordinates may go through a much more complicated and context-dependent transformation, that would change geometric transformation matrix (rotation and translation) according to pre-computed values, which are created depending on the virtual scene being displaced. For example, eye position may map to motion in the direction of a virtual wall. However, as the view changes, the motion is automatically constrained such that it will be equivalent to changing paths to move through a door in the wall, instead of going directly through the wall.

FIG. 3 depicts method 300 for displaying a 3D image in virtual reality, in accordance with an embodiment of the present invention. In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed at least by VRDS 100, as described in FIG. 1.

At 310 of method 300, a hyper parallax transformation matrix is defined based on user head position. In one embodiment, at 312, a hyper parallax transformation is defined based on a product of: a z-axis translation, an x-axis rotation, a y-axis rotation, a z-axis rotation, and an inverse z-axis translation. In another embodiment, at 314, a hyper parallax transformation is defined based on a product of: a z-axis translation, an x-axis rotation, a y-axis rotation, and an inverse z-axis translation. In a further embodiment, at 316, a hyper parallax transformation matrix is defined based on user head position, wherein hand-activated interfaces are not required. In another embodiment, at 318, a point which is a center of rotation of the 3D image is changed to a center of gravity of the 3D image. In one embodiment, at 319, a rotation matrix is defined based on a direct translation from the user eye position.

At 320 of method 300, the hyper parallax transformation matrix is applied to a scene graph. At 330 of method 300, hyper parallax of the 3D image is displayed, wherein a realistic simulation of parallax of the 3D image is exaggerated.

At 340 of method 300, image instability is filtered, wherein the filtering is time-varying. At 345 of method 300, image instability is filtered in response to speed magnitude of the user head.

Various embodiments of the present invention are thus described. While the present invention has been described in particular embodiments, it should be appreciated that the present invention should not be construed as limited by such embodiments, but rather construed according to the following claims.

The invention claimed is:

1. A method for displaying a 3D image in virtual reality, said method comprising:
    defining, by a system including a processor, a hyper parallax transformation matrix based on user eye position;
    applying, by the system, said hyper parallax transformation matrix to a scene graph to cause hyper parallax transformation of said 3D image in virtual reality, the hyper parallax transformation changing a point which is a center of rotation of said 3D image to a center of gravity of said 3D image, and the hyper parallax transformation including exaggerating parallax of said 3D image in response to user motion, the exaggerating of the parallax of said 3D image including zooming into a portion of said 3D image; and
    displaying, by the system, the exaggerated parallax of said 3D image in response to the applying of said hyper parallax transformation matrix.

2. The method of claim 1, wherein defining said hyper parallax transformation matrix based on user eye position comprises:
    defining the hyper parallax transformation based on a product of:
        a z-axis translation;
        an x-axis rotation; and
        a y-axis rotation.

3. The method of claim 1, wherein defining said hyper parallax transformation matrix based on user eye position comprises:
    defining the hyper parallax transformation based on a product of:
        a z-axis translation;
        an x-axis rotation;
        a y-axis rotation; and
        an inverse z-axis translation.

4. The method of claim 1, wherein defining said hyper parallax transformation matrix based on user eye position comprises:
    defining said hyper parallax transformation matrix based on user head position, wherein hand-activated interfaces are not required.

5. The method of claim 1, further comprising:
    filtering image instability, wherein said filtering is time-varying.

6. The method of claim 5, wherein said filtering image instability comprises:
    filtering image instability in response to a magnitude of a speed of a user head.

7. The method of claim 1, wherein defining said hyper parallax transformation matrix based on user eye position comprises:
    defining a rotation matrix based on a direct translation from said user eye position.

8. The method of claim 1, wherein the scene graph contains geometric information about how each component of said 3D image is to be displayed, and how an overall scene of said 3D image is to be displayed.

9. The method of claim 1, wherein applying the hyper parallax transformation matrix is based on at least a z-axis translation, an x-axis rotation, and a y-axis rotation.

10. A display system for displaying a 3D image in virtual reality, said display system comprising:
    at least one processor configured to:
        generate a hyper parallax transformation matrix based on user head position detected by a motion detector, and
        apply said hyper parallax transformation matrix to a scene graph, the applying causing hyper parallax transformation of said 3D image in virtual reality, the hyper parallax transformation changing a point which is a center of rotation of said 3D image to a center of gravity of said 3D image, and the hyper parallax transformation including exaggerating parallax of said 3D image in response to user motion, the exaggerating of the parallax of said 3D image including zooming into a portion of said 3D image.

11. The display system of claim 10, wherein said display system does not require a hand activated interface for said exaggerating of said parallax of said 3D image.

12. The display system of claim 10, further comprising a hyper parallax module executable on the at least one processor to perform the generating and the applying, the hyper parallax module comprising a z-axis translator, an x-axis rotator, a y-axis rotator, and a z-axis inverse translator.

13. The display system of claim 12, wherein said hyper parallax module further comprises:
    a z-axis rotator.

14. The display system of claim 10, further comprising:
    a time varying filter configured to filter image instability.

15. The display system of claim 14, comprising:
    the motion detector, wherein said time varying filter is configured to filter said image instability in response to a speed magnitude measured by said motion detector.

16. The display system of claim 10, further comprising:
    a hand controlled interface.

17. The display system of claim 10, wherein applying the hyper parallax transformation matrix is based on at least a z-axis translation, an x-axis rotation, and a y-axis rotation.

18. A non-transitory computer-readable storage medium storing instructions that upon execution cause a system to:
    define a hyper parallax transformation matrix based on user eye position;
    apply said hyper parallax transformation matrix to a scene graph to cause hyper parallax transformation of a 3D image in virtual reality, the hyper parallax transformation changing a point which is a center of rotation of said 3D image to a center of gravity of said 3D image, and the hyper parallax transformation including exaggerating parallax of said 3D image in response to user motion, the exaggerating of the parallax of said 3D image including zooming into a portion of said 3D image; and
    cause display of the exaggerated parallax of said 3D image in response to the applying of said hyper parallax transformation matrix.

\* \* \* \* \*